(12) United States Patent
Enderle et al.

(10) Patent No.: US 6,629,778 B1
(45) Date of Patent: Oct. 7, 2003

(54) FLUID PRESSURE BEARING

(75) Inventors: Eckhard Enderle, Aalen-Dewangen (DE); Dieter Kaufmann, Heidenheim (DE)

(73) Assignee: Carl-Zeiss-Stiftung, Heidenheim-Brenz (DE)

( * ) Notice: Subject to any disclaimer, the term of this patent is extended or adjusted under 35 U.S.C. 154(b) by 0 days.

(21) Appl. No.: 09/644,049

(22) Filed: Aug. 23, 2000

(30) Foreign Application Priority Data

Aug. 24, 1999 (DE) .......................... 199 40 103

(51) Int. Cl.⁷ .............................................. F16C 32/06
(52) U.S. Cl. .......................................... 384/12; 384/103
(58) Field of Search .......................... 384/12, 103, 104, 384/105

(56) References Cited

U.S. PATENT DOCUMENTS

| 3,137,530 A | | 6/1964 | Kohler | |
|---|---|---|---|---|
| 3,583,774 A | * | 6/1971 | De Gast | 384/12 |
| 3,653,458 A | * | 4/1972 | Donlon | 180/116 |
| 4,045,098 A | | 8/1977 | Blondeel | |
| 4,226,483 A | * | 10/1980 | Yamamoto | 384/12 |
| 4,448,460 A | * | 5/1984 | Yamamoto | 384/12 |
| 4,449,834 A | * | 5/1984 | Franken et al. | 384/99 |
| 4,560,213 A | | 12/1985 | Enderle et al. | |
| 4,865,465 A | * | 9/1989 | Sugita et al. | 384/12 |
| 5,967,666 A | * | 10/1999 | Johnson | 180/116 |

FOREIGN PATENT DOCUMENTS

| DE | 2544872 | 4/1976 |
|---|---|---|
| DE | 4125802 | 2/1993 |
| DE | 196 03 218 | 7/1997 |
| EP | 0 065 337 | 11/1982 |

\* cited by examiner

*Primary Examiner*—William C Joyce
(74) *Attorney, Agent, or Firm*—Walter Ottesen (57) ABSTRACT

A bearing arrangement has fluid pressure bearings which permit an especially stiff support and is therefore especially well suited for high precision machines such as coordinate measuring apparatus. The bearing arrangement includes at least two fluid pressure bearings (12, 13, 14, 15, 16, 17) having a membrane formed as a support end. The membrane is concavely deformed by the bearing pressure. The bearing arrangement also includes a rigidly configured bearing base body which is supported on the two fluid pressure bearings. The rigid support is achieved in that at least one of the fluid pressure bearings includes a bearing housing (12*a*, 12*b*; 13*a*, 13*b*; 14*a*, 14*b*) which is configured as one piece and in that the bearing base body (6) is operatively connected directly to the bearing housing (12*a*, 12*b*; 13*a*, 13*b*; 14*a*, 14*b*). The bearing housing includes at least the membrane.

60 Claims, 4 Drawing Sheets

FLUID PRESSURE BEARING

FIELD OF THE INVENTION

The invention relates to a bearing arrangement having at least two fluid pressure bearings which include at least one membrane, which is formed as the supporting end and which is formed to have a concave configuration because of the bearing pressure. The invention also relates to a bearing base body which is supported on the two fluid pressure bearings. Bearing arrangements of this kind have already been known for a long time and are utilized especially for machines where a high-precision support is required such as in coordinate measuring apparatus. The high-precision support is possible with the above-mentioned fluid pressure bearings because the bearing gap in fluid pressure bearings of this kind is held substantially constant by the deformability of the membranes independently of the load of the bearing.

BACKGROUND OF THE INVENTION

Fluid pressure bearings of this kind, which are used in such bearing arrangements, are known, for example, from U.S. Pat. No. 4,449,834; U.S. Pat. No. 5,199,796; U.S. Pat. No. 4,560,213; and, U.S. Pat. No. 4,045,098.

All fluid pressure bearings referred to in the above publications have in common that they have a ball at the end of the fluid pressure bearing which faces away from the membrane. A support pin having an inner conical surface is supported on the ball so that the fluid pressure bearing is rotatably movable about the pin. The support pin itself is usually provided with a thread which threadably engages the bearing base body so that the elevation of the fluid pressure bearing relative to the bearing base body can be additionally changed. In this way, it is possible to secure a plurality of different fluid pressure bearings of the above-mentioned type on one and the same bearing base body. The fluid pressure bearings can be simply adjusted in that the distance of the fluid pressure bearing from the bearing base body is changed by rotating the support pins on the one hand and the particular bearings align themselves via the rotationally movable connection to the support pin on the guide surface on the other hand.

Another characteristic of the fluid pressure bearings known from the above publications is that, in all known fluid pressure bearings, the bearing housing is so configured that the membrane, which is formed as the support end, and that end of the bearing housing, on which the bearing base body is braced via the above-mentioned ball and the support pin, are two different components.

The known fluid pressure bearings function quite well especially in coordinate measuring apparatus. However, it has been shown that the stiffness of the fluid pressure bearings to date is no longer sufficient with the ever increasing quality requirements imposed on the precision of the coordinate measuring apparatus.

SUMMARY OF THE INVENTION

Starting from the above, it is an object of the invention to provide a bearing arrangement of the known type but wherein the stiffness can be considerably increased when utilizing the above-mentioned fluid pressure bearings.

The bearing arrangement of the invention includes: at least two fluid pressure bearings; a rigidly configured base body journalled on the fluid pressure bearings; each one of the fluid pressure bearings having a membrane defining a supporting end thereof; a pressure supply for supplying fluid under pressure to the bearings to cause the membranes to concavely deform and support the bearings and the rigid base body; at least one of the fluid pressure bearings having a one-piece bearing housing which includes the membrane thereof; and, the base body and the one-piece bearing housing conjointly defining a direct connection therebetween.

A significant feature of the bearing arrangement is especially that at least one of the fluid pressure bearings has a bearing housing, which is configured as one piece and which includes at least the membrane and that this bearing housing is directly connected to the bearing base body.

In this way, a series of significant advantages results compared to the known bearing arrangements. The bearing housing, which is configured as one piece, is connected directly to the bearing base body. For this reason, a significantly greater stiffness of the entire bearing results because the above-mentioned ball as well as the support pin are no longer needed and especially these components have considerably limited the stiffness of the entire bearing arrangement. Because the support pin and the ball are not needed, the bearing must no longer be centrally journalled; instead, the bearing can also be journalled in its outer edge regions which likewise contributes significantly to the stability of the bearing. Because the bearing housing is one piece, significant manufacturing and assembly advantages result because the bearing housing can be produced in only a single manufacturing operation and an assembly for the completion of the bearing housing can be completely avoided.

In principle, all other fluid pressure bearings can be likewise so configured in that the bearing housing is connected to the bearing base body. Alternatively, the other fluid pressure bearings or parts thereof can be configured in the conventional manner which is especially then purposeful when the particular fluid pressure bearings are used as a counter support.

At this point, the term bearing base body should be clearly described. The bearing base body is a rigid body which is mounted on at least two fluid pressure bearings. The bearing base body can assume different forms. For example, the base body can be a body which does not require much space and especially functions to fix the fluid pressure bearing as is the case in the embodiments described with respect to the drawings hereinafter. The bearing base body can, however, also include the entire component to be journalled which, for example, is the case when an elongated component is intended to be journalled at both of its ends. It is understood that the rigid bearing base body need not be configured as one piece; instead, the rigid bearing base body can be assembled from a plurality of individual parts.

The most different fluids are conceivable for operating the fluid pressure bearings. For example, water or oil can be used as a fluid. However, gases and especially air are especially advantageously used.

In a first embodiment, the connection between at least one of the bearing housings of the fluid pressure bearings and the bearing base body is generated in that at least one part of the rigid bearing base body and the bearing housing of at least one of the air bearings are manufactured monolithically from one block. In this way, the advantage results that an especially stiff assembly can be obtained between the bearing base body and the membrane. This is so because the bearing housings and especially the membrane as well as the bearing base body consist of a single part. Especially with respect to manufacture, the special advantage results that manufacturing is especially efficient because the separate manufacture of the bearing housing and of at least one part of the bearing base body (on which the bearing housing is included) can all be omitted.

In another embodiment of the invention, the bearing housing, which is configured as one piece, can also be a separate component which, in addition to the membrane, has a membrane holder and the bearing base body is directly journalled on the membrane holder for the connection between the bearing housing and the bearing base body.

In its simplest version, this second embodiment could be seen as an alternative to the bearing housing manufactured monolithically with the bearing base body. To clearly fix the bearing housing, a cutout could be provided in the bearing base body which exhibits a base or at least a projection on which the membrane holder of the bearing base body is mounted. Alternatively, it is also conceivable to journal the membrane holder directly on a planar surface of the bearing base body and to fix the latter, for example, via screws and pins against lateral slippage.

In an especially advantageous manner, the second alternative can be improved when the membrane holder is configured so as to be round and either the end of the membrane holder is configured so as to be a segment of a sphere and the base or the projection is configured as a truncated cone or the base or the projection is configured as a segment of a sphere and the end of the membrane holder is configured as a truncated cone. This embodiment affords the special advantage that, on the one hand, the bearing housing, which is configured as one part, is directly connected to the bearing base body and, on the other hand, the bearing housing is journalled so as to be rotationally movable on the bearing base body and thereby is self adjustable.

The two different embodiments, namely, the monolithic manufacture of the bearing housing in common with at least one part of the bearing base body and, on the other hand, the journalling of the membrane holder of the bearing housing, which is configured as one piece, on the bearing base body is then especially well combined when the bearing arrangement can be journalled simultaneously on at least two parallel guide surfaces but inclined toward each other. For this case, that particular fluid pressure bearing can be journalled on the first one of the two guide surfaces whose bearing housing is configured as one block in common with at least one part of the bearing base body. On the other one of the two guide surfaces, which are inclined toward each other, the second embodiment of the air bearing should be used whose bearing housing has the membrane holder. The bearing base body is journalled on the membrane holder of the bearing housing because this bearing can be configured to be self adjusting on the second guide surface as described above. This combination simplifies the production of the bearing base body considerably because the angle, which is conjointly defined by the two mutually inclined guide surfaces, can be maintained with high precision by the bearing base body when the fluid pressure bearings of the second guide surface would likewise be configured monolithically from a part of the bearing base body. Angles of this precision can be obtained only with considerable manufacturing complexity. For this reason, it is therefore purposeful to configure the bearings of the second guide surface to be self adjusting bearings in the manner described above even when this is associated with a modest reduction of stiffness.

The above two embodiments of bearing arrangements of the invention are especially advantageous when the fluid is supplied directly to the fluid-feed openings of the membranes and, in addition, a throttle is attached to the membrane. The throttle is fed via a fluid supply. In this way, the flow relationships can be individually changed for each individual fluid pressure bearing which is of special significance when several bearing housings are made together monolithically from a block with a part of the bearing base body. In this way, the total bearing arrangement can be correspondingly adjusted to the load conditions via a suitable selection of throttles. In order to have a possibility to correspondingly match the fluid pressure bearings especially even after the manufacture of the bearing base body, the throttle can be attached to the bearing housing so that it can be exchanged. One possibility would, for example, be that the throttle is threadably engaged in a winding provided in the membrane. Another possibility is, for example, to insert the throttle and to fixedly clamp the same via a corresponding catch.

It is especially advantageous when the bearing base body has at least one breakthrough for one of the fluid pressure bearings so that the bearing housing is accessible from the side of the bearing base body facing away from the bearing housing. In this way, the especially significant advantage is afforded that an exchange of the throttles is possible even after the assembly of the bearing arrangement on the guide and that the bearings can be correspondingly matched even at this point in time.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
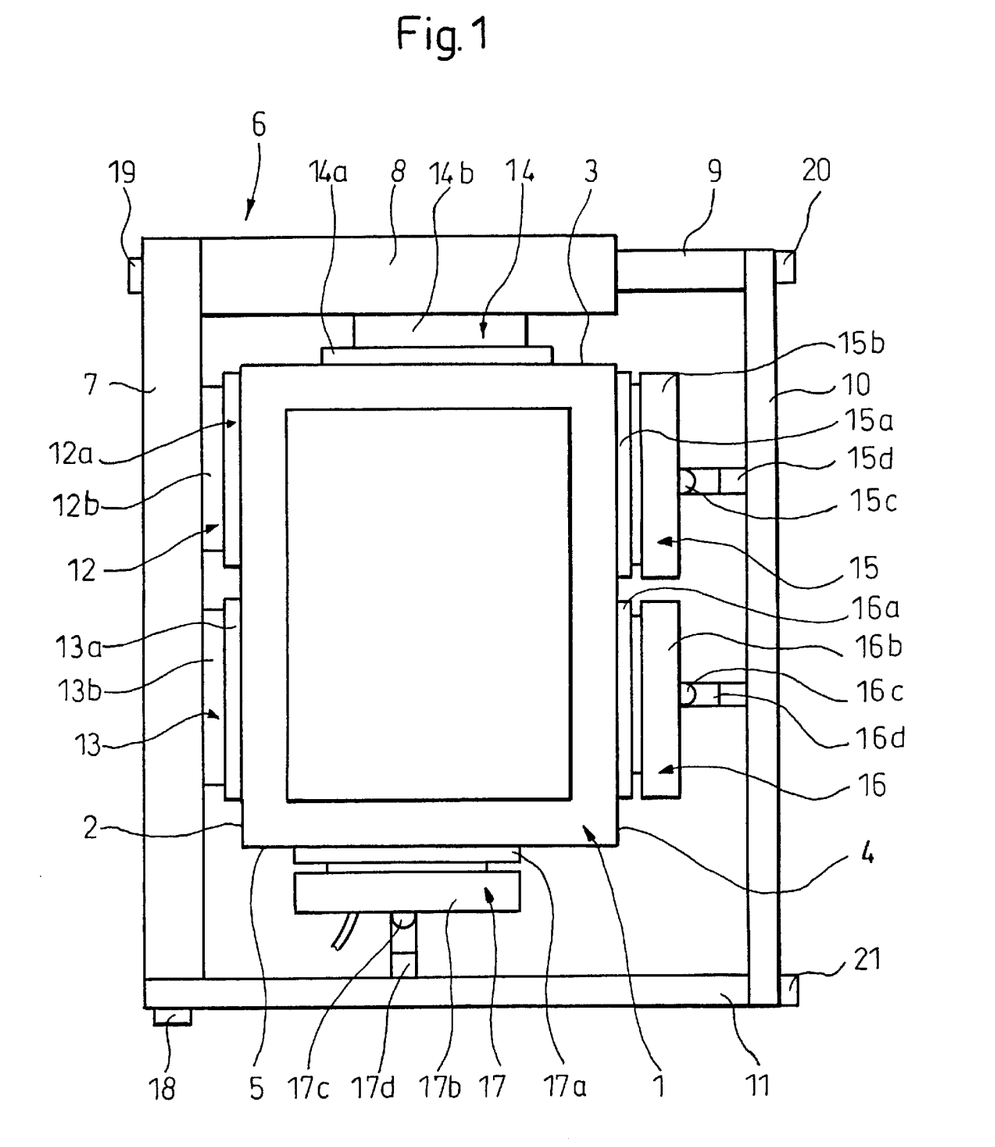
FIG. 1 is a side elevation view showing the essential components of the bearing arrangement according to an embodiment of the invention.

FIG. 1 shows a bearing arrangement according to the invention and includes only the essential components thereof needed to describe the invention. Details such as the air supply et cetera are not shown.

Referring to FIG. 1, the bearing arrangement includes a stationary guide profile 1 having four guide surfaces 2 to 5. The guide surfaces 2 to 5 are at right angles to each other and fluid pressure bearings 12 to 17 run on and along these guide surfaces. The fluid pressure bearings 12 to 17 are configured as air bearings in the embodiment shown and operate with pressurized air. The fluid pressure bearings 12 to 17 support a rigid bearing base body 6 which is made up of plates (7, 8, 10 and 11) and rods 9 lying one behind the other. Only the forward rod 9 is shown in FIG. 1. A thread is cut into the rod 9 on the left end thereof which is threadably engaged in a corresponding internal thread of the plate 8. Otherwise, the components (10, 11, 7, 8 and 9) are threadably joined to each other to form a rigid bearing base body via screws (18, 19, 20, 21) as well as the corresponding number of screws which are not visible because of the direction of the side elevation view. The fluid pressure bearings (15, 16, 17) are known air bearings having a membrane configured as a supporting end. This membrane is deformed to assume a concave shape because of the bearing pressure as described, for example, in U.S. Pat. No. 4,560,213 incorporated herein by reference.

As described in U.S. Pat. No. 4,560,213, the bearings (15, 16, 17) include a bearing housing (15b, 16b, 17b) on which a membrane (15a, 16a, 17a) is supported on corresponding tilt locations. A ball (15c, 16c, 17c) is, in turn, provided on the bearing housing (15b, 16b, 17b) which, in turn, is journalled on a pin (15d, 16d, 17d) in a conically-shaped recess. The pins (15d, 16d, 17d) are configured to have two parts. The two parts are each pressed apart by a spring so that the fluid pressure bearings (15, 16, 17) are hereby pressed against the guide surfaces (4, 5).

In contrast to the fluid pressure bearings (15, 16, 17), the remaining fluid pressure bearings (12, 13, 14) are fluid pressure bearings according to the invention which, in the embodiment shown, are likewise air bearings operated with pressurized air. The fluid pressure bearings (12, 13, 14) will now be explained in greater detail in connection with FIGS. 2 and 3.

Four fluid pressure bearings are attached to the plate 7 of the bearing base body 6. Only the forward two fluid pressure bearings (12, 13) can be seen whereas the two fluid pressure bearings, which lie behind bearings (12, 13), are hidden by the fluid pressure bearings (12, 13) because of the direction of view. The precise assembly of the fluid pressure bearings (12, 13) will now be described in greater detail with respect to FIG. 2 which shows a portion of the plate 7 and the fluid pressure bearing 13 as well as part of the guide profile 1 in section.

Figure 2:
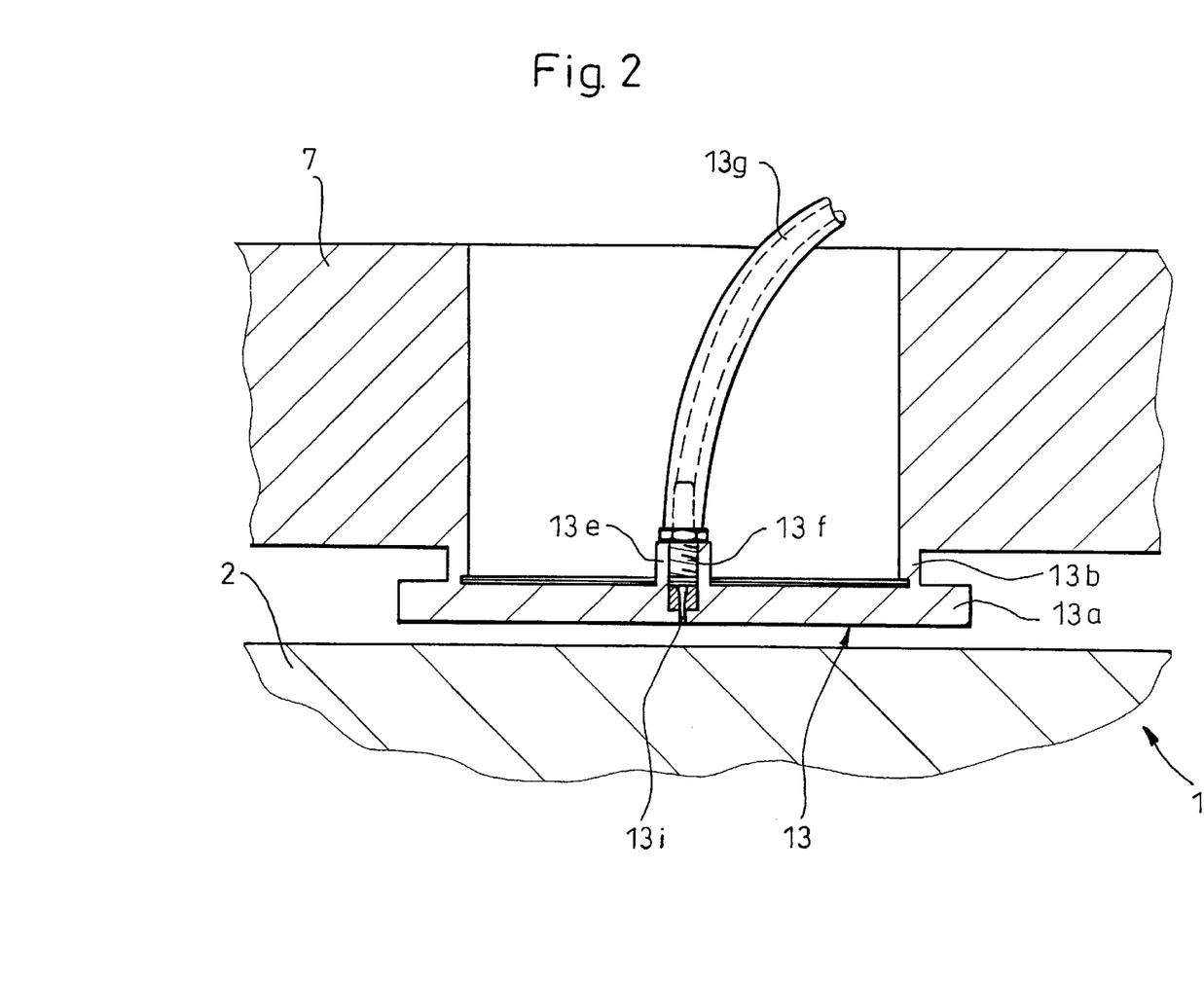
FIG. 2 shows a plate of the bearing base body as well as the fluid pressure bearing of the bearing arrangement of FIG. 1.

As shown in FIG. 2, the bearing housing (13a, 13b) of the fluid pressure bearing 13 is configured as one part and, in addition to the tilt support 13b, also includes a membrane 13a configured as a supporting end. The membrane 13a can be concavely deformed because of the bearing pressure. As shown in FIG. 2, the bearing housing (13a, 13b) is monolithically manufactured from a single block with the plate 7 of the rigid bearing base body 6. This applies also to the other three fluid pressure bearings provided on the plate 7.

As shown in FIG. 2, the fluid pressure bearing is so manufactured that the membrane 13a is connected to the plate 7 only via the relatively narrow tilt support 13b. The tilt support includes a slot in the interior of the fluid pressure bearing which reduces the thickness of the tilt support 13b in the region of the membrane. This slot can also be provided on the outer diameter. Alternatively, the slot can be omitted entirely when the tilt support is configured so as to be correspondingly thin walled.

In this way, a tilt support is provided for the membrane 13a about which the membrane can tilt, as required, when it concavely deforms. A small stub 13e having a cutout and an internal thread is provided in the region of the fluid-feed opening. A throttle 13f is threadably engaged in the internal thread so that the throttle 13f is attached at the fluid-feed opening 13i of the membrane 13a and can be exchanged. The throttle 13f is fed by a fluid feed in the form of a pressurized air hose 13g. As mentioned above, a throttle 13f can be exchanged for another throttle at any time even after manufacture with this measure. In this way, the fluid pressure bearing 13 can be matched in correspondence to the other three fluid pressure bearings.

As mentioned above, the bearing base body 6 includes a breakthrough in this fluid pressure bearing which is especially provided during manufacture so that the bearing housing (13a, 13b) is accessible from the end of the bearing base body 6 facing away from the bearing housing (13a, 13b) so that the throttle 13f can be exchanged even after the assembly of the bearing arrangement on the guide profile 1.

Two bearings, which lie one behind the other, are guided on the second guide surface 3 (see FIG. 1). These two bearings are, however, configured the same way as the second embodiment already described. Only the front bearing 14 of the two bearings is visible because of the direction of view.

The precise assembly of the bearing 14 will now be described with respect to FIG. 3 wherein a portion of the plate 8 of the bearing base body 6 and the bearing 14 are shown in section. In this second embodiment also, the bearing housing (14a, 14b) is configured as one piece and includes a membrane 14a which is configured as a supporting end and which is concavely deformed by the bearing pressure.

Figure 3:
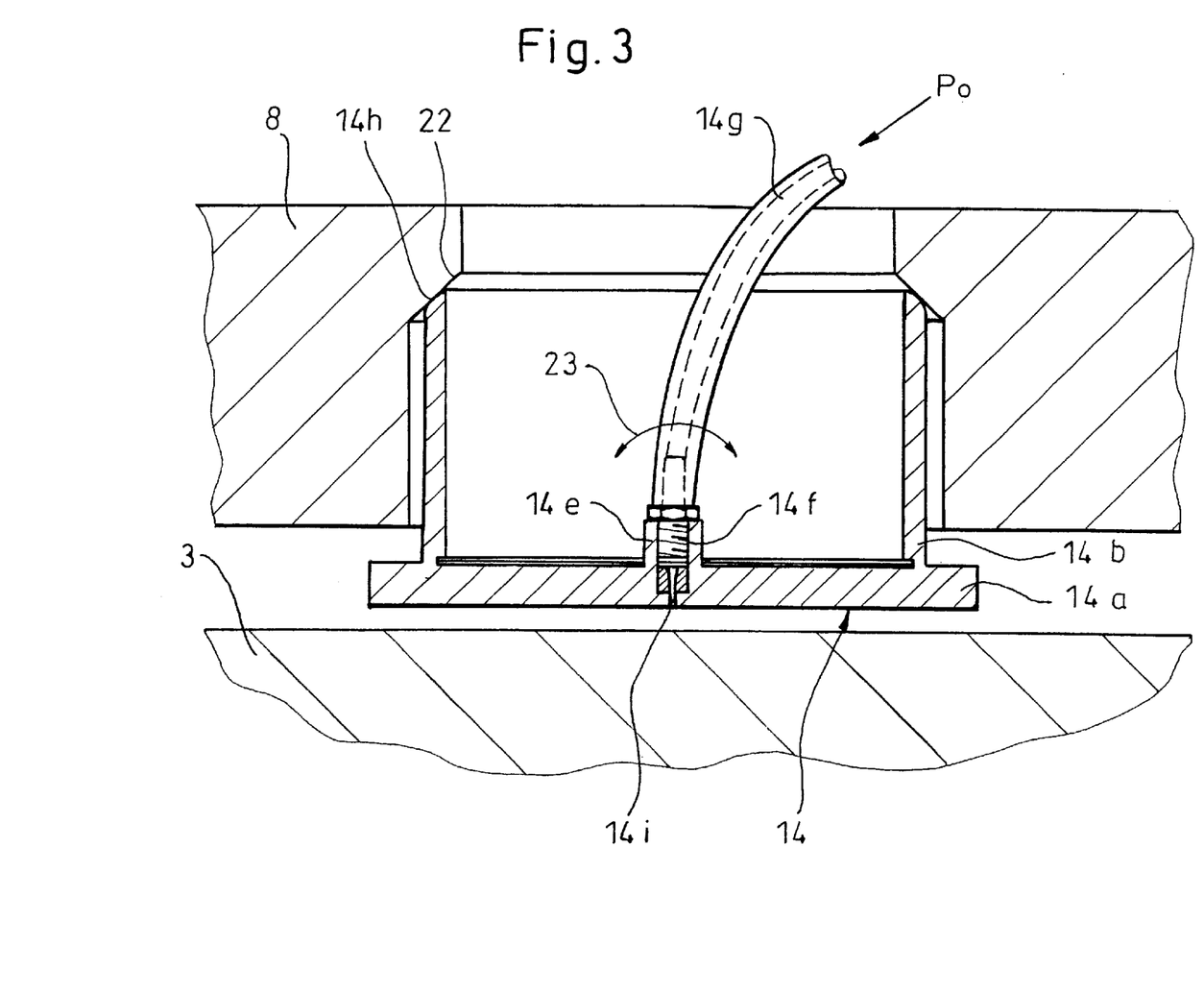
FIG. 3 shows a plate of the bearing base body as well as the fluid pressure bearing in section; and, FIG. 4 shows a plate of the bearing base body as well as a fluid pressure bearing in section according to another embodiment.

In the embodiment of FIG. 3, the bearing housing (14a, 14b) is, however, a separate component and is produced separately from the rigidly configured bearing base body 6 or the plate 8 with which the bearing housing (14a, 14b) is operatively connected. The tilt support, which is shown in FIG. 2, is configured in the form of a membrane holder 14b in the embodiment of FIG. 3. In contrast to FIG. 2, the bearing base body 6, that is, the plate 8 thereof, is supported directly on the membrane holder. In this case, the membrane holder 14b is supported in a cutout on an appropriate step 22. The cutout is provided in the plate 8. The end 14h of the membrane holder 14b lies against the step 22 and is configured to define a rounded segment and the step 22 is configured as a truncated conical surface so that the bearing housing (14a, 14b) is rotatably movable relative to the bearing base body 6 and the plate 8 thereof as indicated by then double arrow 23. In this way, a self adjusting bearing is provided.

Figure 4:
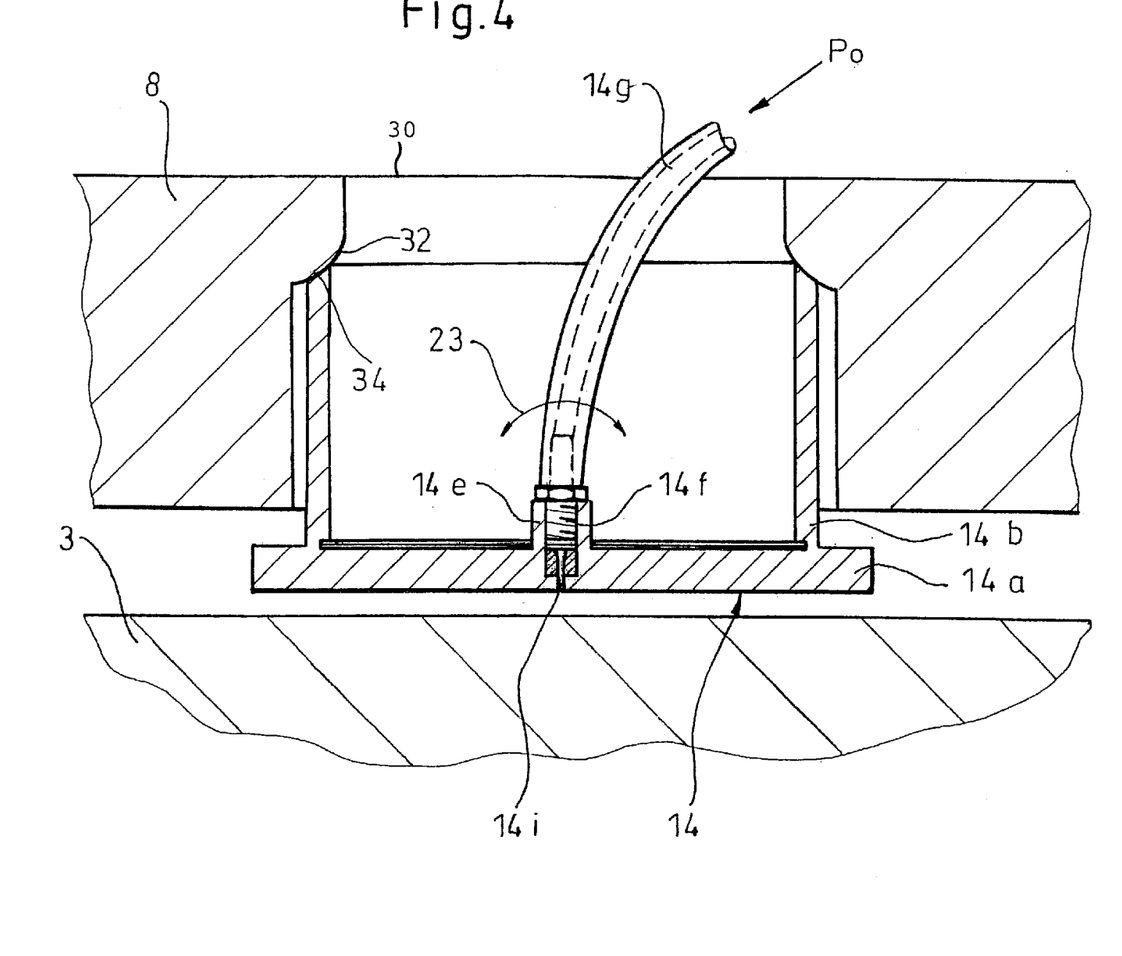

In the embodiment of FIG. 4, the bearing housing (14a, 14b) is also a separate component and is produced separately from the rigidly configured bearing base body 6 or the plate 8 with which the bearing housing (14a, 14b) is operatively connected. The tilt support, which is shown in FIG. 2, is configured in the form of a membrane holder 14b in the embodiment of FIG. 4. In contrast to FIG. 2, the bearing base body 6, that is, the plate 8 thereof, is supported directly on the membrane holder. In this case, the membrane holder 14b is supported in a cutout 30 on a rounded step 32. The breakout or cutout 30 is provided in the plate 8. The end 34 of the membrane holder 14b lies against the step 32 and is configured to define a truncated cone. In this way, the bearing housing (14a, 14b) is rotatably movable relative to the bearing base body 6 and the plate 8 thereof as indicated by then double arrow 23. Here too, a self adjusting bearing is provided.

As can be seen in FIG. 1, this configuration has the significant advantage that the plate 8 of the bearing base body 6 relative to the plate 7 of the bearing base body 6 does not have to be adapted exactly to the angle of the guide surfaces (2, 3); instead, the angle can deviate from the ideal angle so that the bearing housing (14a, 14b) can align itself automatically because of its rotational movable support. Notwithstanding the self-adjusting characteristics of the bearing housing (14a, 14b), the bearing housing (14a, 14b), which is configured as one piece, is nonetheless in direct connection with the rigid bearing body 6 or the plate 8 thereof so that a completely stiff connection is nonetheless present thereby.

The bearing arrangement according to FIG. 1 is therefore a bearing arrangement which can be supported simultaneously on at least two parallel guiding surfaces (2, 3) which are inclined with respect to each other. The air bearings (12, 13) are supported on a first one of the two bearing surfaces and the bearing housing (12*a*, 12*b*) or (13*a*, 13*b*) is monolithically manufactured with at least one part 7 of the bearing base body 6 from a block. At least one air bearing 14 is supported on the second guide surface 3 and has a bearing housing having the membrane holder 14. The bearing base body 6 or the plate 8 thereof is journalled on the membrane holder 14*b* of the bearing housing (14*a*, 14*b*).

It is understood that the foregoing description is that of the preferred embodiments of the invention and that various changes and modifications may be made thereto without departing from the spirit and scope of the invention as defined in the appended claims.

What is claimed is:

1. A bearing arrangement comprising:
   at least two fluid pressure bearings;
   a rigidly configured base body incorporating said fluid pressure bearings;
   each one of said fluid pressure bearings having a membrane defining a supporting end thereof;
   a pressure supply for supplying fluid under pressure to said bearings to cause said membranes to concavely deform and support said bearings and said rigid base body;
   at least one of said fluid pressure bearings having a one-piece bearing housing which includes the membrane thereof;
   said base body and said one-piece bearing housing conjointly defining a direct connection therebetween;
   said base body having a side facing away from the bearing housing of at least one of said fluid pressure bearings; and,
   said base body including a breakout formed in said side thereof for facilitating access to the bearing housing of said at least one of said bearings.

2. The bearing arrangement of claim 1, wherein at least a part of said base body and said one-piece bearing housing are monolithically formed from a block.

3. The bearing arrangement of claim 1, wherein said one-piece bearing housing is a separate integral component including a membrane holder and said membrane is connected to said membrane holder; and, said direct connection being defined by said base body being journalled directly on said membrane holder.

4. The bearing arrangement of claim 3, said base body having a cutout for journalling said membrane holder therein.

5. The bearing arrangement of claim 4, said cutout having a bottom formed in said base body and said membrane holder being journalled on said bottom.

6. The bearing arrangement of claim 5, said bottom being formed as a step in said base body and said membrane holder being journalled on said step.

7. The bearing arrangement of claim 6, said membrane holder having an annular configuration and having an end portion facing away from said membrane and said end portion being in journalling contact engagement with said step.

8. The bearing arrangement of claim 1, said pressure supply including for each of said fluid pressure bearings: a fluid-feed opening arranged on the membrane of each of said fluid pressure bearings; a fluid feed for conducting the fluid under pressure to said fluid-feed opening; and, a throttle for setting the flow condition of the fluid.

9. The bearing arrangement of claim 1, said throttle being mounted at said fluid-feed opening and being exchangeable so that the flow condition for the corresponding fluid pressure bearing can be adjusted.

10. The bearing arrangement of claim 1, said pressure supply further including for each of said fluid pressure bearings: a thread formed in the membrane for threadably engaging said throttle at said fluid-feed opening.

11. The bearing arrangement of claim 1, said pressure supply including for each of said fluid pressure bearings: a fluid-feed opening arranged on the membrane of each of said fluid pressure bearings and a fluid feed for conducting the fluid under pressure to said fluid-feed opening; and, at least one of said fluid pressure bearings including a throttle for setting the flow condition of the fluid.

12. A bearing arrangement comprising:
    at least two fluid pressure bearings;
    a rigidly configured base body incorporating said fluid pressure bearings;
    each one of said fluid pressure bearings having a membrane defining a supporting end thereof;
    a pressure supply for supplying fluid under pressure to said bearings to cause said membranes to concavely deform and support said bearings and said rigid base body;
    at least one of said fluid pressure bearings having a one-piece bearing housing which includes the membrane thereof;
    said base body and said one-piece bearing housing conjointly defining a direct connection therebetween;
    said one-piece bearing housing being a separate integral component including a membrane holder and said membrane is connected to said membrane holder;
    said direct connection being defined by said base body being journalled directly on said membrane holder;
    said base body having a cutout for journalling said membrane holder therein;
    said cutout having a bottom formed in said base body and said membrane holder being journalled on said bottom;
    said bottom being formed as a step in said base body and said membrane holder being journalled on said step;
    said membrane holder having an annular configuration and having an end portion facing away from said membrane and said end portion being in journalling contact engagement with said step; and,
    said end portion having a rounded configuration and said step being formed as a truncated cone.

13. A bearing arrangement comprising:
    at least two fluid pressure bearings;
    a rigidly configured base body incorporating said fluid pressure bearings;
    each one of said fluid pressure bearings having a membrane defining a supporting end thereof;
    a pressure supply for supplying fluid under pressure to said bearings to cause said membranes to concavely deform and support said bearings and said rigid base body;
    at least one of said fluid pressure bearings having a one-piece bearing housing which includes the membrane thereof;
    said base body and said one-piece bearing housing conjointly defining a direct connection therebetween;
    said one-piece bearing housing being a separate integral component including a membrane holder and said membrane is connected to said membrane holder;

said direct connection being defined by said base body being journalled directly on said membrane holder;
said base body having a cutout for journalling said membrane holder therein;
said cutout having a bottom formed in said base body and said membrane holder being journalled on said bottom;
said bottom being formed as a step in said base body and said membrane holder being journalled on said step;
said membrane holder having an annular configuration and having an end portion facing away from said membrane and said end portion being in journalling contact engagement with said step; and,
said end portion being configured as a truncated cone and said step being rounded.

14. A bearing arrangement comprising:
at least two fluid pressure bearings;
a rigidly configured base body incorporating said fluid pressure bearings;
each one of said fluid pressure bearings having a membrane defining a supporting end thereof;
a pressure supply for supplying fluid under pressure to said bearings to cause said membranes to concavely deform and support said bearings and said rigid base body;
at least one of said fluid pressure bearings having a one-piece bearing housing which includes the membrane thereof;
said base body and said one-piece bearing housing conjointly defining a direct connection therebetween;
said pressure supply including for each of said fluid pressure bearings: a fluid-feed opening arranged on the membrane of each of said fluid pressure bearings; a fluid feed for conducting the fluid under pressure to said fluid-feed opening; and, a throttle for setting the flow condition of the fluid;
said throttle being mounted at said fluid-feed opening and being exchangeable so that the flow condition for the corresponding fluid pressure bearing can be adjusted;
said pressure supply further including for each of said fluid pressure bearings: a thread formed in the membrane for threadably engaging said throttle at said fluid-feed opening;
said base body having a side facing away from the bearing housing of at least one of said fluid pressure bearings; and,
said base body including a breakout formed in said side thereof for facilitating access to the bearing housing of said at least one of said bearings.

15. A bearing arrangement journalled on two guide surfaces which extend in the same direction and are positioned at a predetermined angle relative to each other, the bearing arrangement comprising:
at least first and second fluid pressure bearings;
a rigidly configured base body incorporating said fluid pressure bearings;
each one of said fluid pressure bearings having a membrane defining a supporting end thereof;
a pressure supply for supplying fluid under pressure to said bearings to cause said membranes to concavely deform and support said bearings and said rigid base body on said guide surfaces;
said first fluid pressure bearing being journalled on one of said guide surfaces and said second fluid pressure bearing being journalled on the other one of said guide surfaces;
said first fluid pressure bearing having a one-piece bearing housing which includes the membrane thereof;
at least part of said base body and said one-piece bearing housing being monolithically formed from a block;
said second fluid pressure bearing having a one-piece bearing housing which is a part separate from said base body;
said one-piece bearing housing of said second fluid pressure bearing including the membrane thereof and a membrane holder connected to the membrane; and,
said base body being journalled directly on said membrane holder.

16. The bearing arrangement of claim 15, wherein: said base body and said one-piece bearing housing of said second fluid pressure bearing conjointly define a direct connection therebetween; said one-piece bearing housing of said second fluid pressure bearing is a separate integral component; and, said direct connection being defined by said base body being journalled directly on said membrane holder.

17. The bearing arrangement of claim 15, said base body having a cutout for journalling said membrane holder therein.

18. The bearing arrangement of claim 17, said cutout having a bottom formed in said base body and said membrane holder being journalled on said bottom.

19. The bearing arrangement of claim 18, said bottom being formed as a step in said base body and said membrane holder being journalled on said step.

20. The bearing arrangement of claim 19, said membrane holder having an annular configuration and having an end portion facing away from said membrane and said end portion being in journalling contact engagement with said step.

21. The bearing arrangement of claim 20, said end portion having a rounded configuration and said step being formed as a truncated cone.

22. The bearing arrangement of claim 20, said end portion being configured as a truncated cone and said, step being rounded.

23. The bearing arrangement of claim 15, said pressure supply including for each of said fluid pressure bearings: a fluid-feed opening arranged on the membrane of each of said fluid pressure bearings; a fluid feed for conducting the fluid under pressure to said fluid-feed opening; and, a throttle for setting the flow condition of the fluid.

24. The bearing arrangement of claim 23, said throttle being mounted at said fluid-feed opening and being exchangeable so that the flow condition for the corresponding fluid pressure bearing can be adjusted.

25. The bearing arrangement of claim 24, said pressure supply further including for each of said fluid pressure bearings: a thread formed in the membrane for threadably engaging said throttle at said fluid-feed opening.

26. The bearing arrangement of claim 25, said base body having a side facing away from the bearing housing of at least one of said fluid pressure bearings; and, said base body including a breakout formed in said side thereof for facilitating access to the bearing housing of said at least one of said bearings.

27. The bearing arrangement of claim 15, said pressure supply including for each of said fluid pressure bearings: a fluid-feed opening arranged on the membrane of each of said fluid pressure bearings and a fluid feed for conducting the fluid under pressure to said fluid-feed opening; and, at least one of said fluid pressure bearings including a throttle for setting the flow condition of the fluid.

28. The bearing arrangement of claim 15, said base body having a side facing away from the bearing housing of at least one of said fluid pressure bearings; and, said base body including a breakout formed in said side thereof for facilitating access to the bearing housing of said at least one of said bearings.

29. A bearing arrangement comprising:
at least two fluid pressure bearings;
a rigidly configured base body incorporating said fluid pressure bearings;
each one of said fluid pressure bearings having a membrane defining a supporting end thereof;
a pressure supply for supplying fluid under pressure to said bearings to cause said membranes to concavely deform and support said bearings and said rigid base body;
at least one of said fluid pressure bearings having a one-piece bearing housing which includes the membrane thereof;
said base body and said one-piece bearing housing conjointly defining a direct connection therebetween;
said one-piece bearing housing being a separate integral component including a membrane holder and said membrane being connected to said membrane holder;
said direct connection being defined by said base body being journalled directly on said membrane holder;
said base body having a cutout for journalling said membrane holder therein;
said cutout having a bottom formed in said base body and said membrane holder being journalled on said bottom;
said bottom being formed as a step in said base body and said membrane holder being journalled on said step;
said membrane holder having an annular configuration and having an end portion facing away from said membrane and said end portion being in journalling contact engagement with said step; and,
said end portion having a rounded configuration and said step being formed as a truncated cone.

30. A bearing arrangement comprising:
at least two fluid pressure bearings;
a rigidly configured base body incorporating said fluid pressure bearings;
each one of said fluid pressure bearings having a membrane defining a supporting end thereof;
a pressure supply for supplying fluid under pressure to said bearings to cause said membranes to concavely deform and support said bearings and said rigid base body;
at least one of said fluid pressure bearings having a one-piece bearing housing which includes the membrane thereof;
said base body and said one-piece bearing housing conjointly defining a direct connection therebetween;
said one-piece bearing housing being a separate integral component including a membrane holder and said membrane being connected to said membrane holder;
said direct connection being defined by said base body being journalled directly on said membrane holder;
said base body having a cutout for journalling said membrane holder therein;
said cutout having a bottom formed in said base body and said membrane holder being journalled on said bottom;
said bottom being formed as a step in said base body and said membrane holder being journalled on said step;
said membrane holder having an annular configuration and having an end portion facing away from said membrane and said end portion being in journalling contact engagement with said step; and,
said end portion being configured as a truncated cone and said step being rounded.

31. A bearing arrangement comprising:
two fluid pressure bearings for supporting said bearing arrangement on a guide surface;
a rigidly configured base body defining a first surface opposite to said guide surface and incorporating said fluid pressure bearings;
each one of said fluid pressure bearings having a membrane defining a supporting end for acting on said guide surface;
a pressure supply for supplying fluid under pressure to said bearings to cause said membranes to concavely deform and support said bearings and said rigid base body;
said fluid pressure bearings each having a one-piece bearing housing which includes the membrane thereof;
said base body and each one of said one-piece bearing housings conjointly defining a direct connection therebetween so as to place the membrane corresponding thereto in spaced relationship to said first surface of said base body; and,
said base body and said one-piece bearing housings and said membranes being monolithically formed from a block.

32. The bearing arrangement of claim 31, said pressure supply including for each of said fluid pressure bearings: a fluid-feed opening arranged on the membrane of each of said fluid pressure bearings; a fluid-feed for conducting the fluid under pressure to said fluid-feed opening; and, a throttle for setting the flow condition of the fluid.

33. The bearing arrangement of claim 32, said base body having a side facing away from the bearing housing of at least one of said fluid pressure bearings; and, said base body including a breakout formed in said side thereof for facilitating access to the bearing housing of said at least one of said bearings.

34. The bearing arrangement of claim 32, said throttle being mounted at said fluid-feed opening and being exchangeable so that the flow condition for the corresponding fluid pressure bearing can be adjusted.

35. The bearing arrangement of claim 34, said base body having a side facing away from the bearing housing of at least one of said fluid pressure bearings; and, said base body including a breakout formed in said side thereof for facilitating access to the bearing housing of said at least one of said bearings.

36. The bearing arrangement of claim 34, said pressure supply further including for each of said fluid pressure bearings: a thread formed in the membrane for threadably engaging said throttle at said fluid-feed opening.

37. The bearing arrangement of claim 31, said pressure supply including for each of said fluid pressure bearings: a fluid-feed opening arranged on the membrane of each of said fluid pressure bearings and a fluid feed for conducting the fluid under pressure to said fluid-feed opening; and, at least one of said fluid pressure bearings including a throttle for setting the flow condition of the fluid.

38. The bearing arrangement of claim 31, said base body having a side facing away from the bearing housing of at least one of said fluid pressure bearings; and, said base body including a breakout formed in said side thereof for facilitating access to the bearing housing of said at least one of said bearings.

39. A bearing arrangement comprising:

at least two fluid pressure bearings;

a rigidly configured base body incorporating said fluid pressure bearings;

each one of said fluid pressure bearings having a membrane defining a supporting end thereof;

a pressure supply for supplying fluid under pressure to said bearings to cause said membranes to concavely deform and support said bearings and said rigid base body;

at least one of said fluid pressure bearings having a one-piece bearing housing which includes the membrane thereof;

said base body and said one-piece bearing housing conjointly defining a direct connection therebetween; and, at least a part of said base body and said one-piece bearing housing being monolithically formed from a block;

said throttle being mounted at said fluid-feed opening and being exchangeable so that the flow condition for the corresponding fluid pressure bearing can be adjusted;

said pressure supply further including for each of said fluid pressure bearings: a thread formed in the membrane for threadably engaging said throttle at said fluid-feed opening;

said base body having a side facing away from the bearing housing of at least one of said fluid pressure bearings; and, said base body including a breakout formed in said side thereof for facilitating access to the bearing housing of said at least one of said bearings.

40. A bearing arrangement comprising:

at least two fluid pressure bearings;

a rigidly configured base body incorporating said fluid pressure bearings;

each one of said fluid pressure bearings having a membrane defining a supporting end thereof;

a pressure supply for supplying fluid under pressure to said bearings to cause said membranes to concavely deform and support said bearings and said rigid base body;

at least one of said fluid pressure bearings having a one-piece bearing housing which includes the membrane thereof;

said base body and said one-piece bearing housing conjointly defining a direct connection therebetween; and, said one-piece bearing housing being a separate integral component rotatably mounted on said base body;

said one-piece bearing housing including a membrane holder and said membrane is connected to said membrane holder; and, said direct connection being defined by said base body being mounted directly on said membrane holder.

41. The bearing arrangement of claim 40, said base body having a cutout for journalling said membrane holder therein.

42. The bearing arrangement of claim 41, said base body having a side facing away from the bearing housing of at least one of said fluid pressure bearings; and, said base body including a breakout formed in said side thereof for facilitating access to the bearing housing of said at least one of said bearings.

43. The bearing arrangement of claim 41, said cutout having a bottom formed in said base body and said membrane holder being journalled on said bottom.

44. The bearing arrangement of claim 43, said base body having a side facing away from the bearing housing of at least one of said fluid pressure bearings; and, said base body including a breakout formed in said side thereof for facilitating access to the bearing housing of said at least one of said bearings.

45. The bearing arrangement of claim 43, said bottom being formed as a step in said base body and said membrane holder being journalled on said step.

46. The bearing arrangement of claim 45, said base body having a side facing away from the bearing housing of at least one of said fluid pressure bearings; and, said base body including a breakout formed in said side thereof for facilitating access to the bearing housing of said at least one of said bearings.

47. The bearing arrangement of claim 45, said membrane holder having an annular configuration and having an end portion facing away from said membrane and said end portion being in journalling contact engagement with said step.

48. The bearing arrangement of claim 47, said base body having a side facing away from the bearing housing of at least one of said fluid pressure bearings; and, said base body including a breakout formed in said side thereof for facilitating access to the bearing housing of said at least one of said bearings.

49. The bearing arrangement of claim 47, said end portion having a rounded configuration and said step being formed as a truncated cone.

50. The bearing arrangement of claim 49, said base body having a side facing away from the bearing housing of at least one of said fluid pressure bearings; and, said base body including a breakout formed in said side thereof for facilitating access to the bearing housing of said at least one of said bearings.

51. The bearing arrangement of claim 47, said end portion being configured as a truncated cone and said step being rounded.

52. The bearing arrangement of claim 51, said base body having a side facing away from the bearing housing of at least one of said fluid pressure bearings; and, said base body including a breakout formed in said side thereof for facilitating access to the bearing housing of said at least one of said bearings.

53. The bearing arrangement of claim 40, said pressure supply including for each of said fluid pressure bearings: a fluid-feed opening arranged on the membrane of each of said fluid pressure bearings; a fluid feed for conducting the fluid under pressure to said fluid-feed opening; and, a throttle for setting the flow condition of the fluid.

54. The bearing arrangement of claim 53, said base body having a side facing away from the bearing housing of at least one of said fluid pressure bearings; and, said base body including a breakout formed in said side thereof for facilitating access to the bearing housing of said at least one of said bearings.

55. The bearing arrangement of claim 53, said throttle being mounted at said fluid-feed opening and being exchangeable so that the flow condition for the corresponding fluid pressure bearing can be adjusted.

56. The bearing arrangement of claim 55, said base body having a side facing away from the bearing housing of at least one of said fluid pressure bearings; and, said base body including a breakout formed in said side thereof for facilitating access to the bearing housing of said at least one of said bearings.

57. The bearing arrangement of claim 55, said pressure supply further including for each of said fluid pressure bearings: a thread formed in the membrane for threadably engaging said throttle at said fluid-feed opening.

58. The bearing arrangement of claim 57, said base body having a side facing away from the bearing housing of at least one of said fluid pressure bearings; and, said base body including a breakout formed in said side thereof for facilitating access to the bearing housing of said at least one of said bearings.

59. The bearing arrangement of claim 40, said pressure supply including for each of said fluid pressure bearings: a fluid-feed opening arranged on the membrane of each of said fluid pressure bearings and a fluid feed for conducting the fluid under pressure to said fluid-feed opening; and, at least one of said fluid pressure bearings including a throttle for setting the flow condition of the fluid.

60. The bearing arrangement of claim 40, said base body having a side facing away from the bearing housing of at least one of said fluid pressure bearings; and, said base body including a breakout formed in said side thereof for facilitating access to the bearing housing of said at least one of said bearings.

* * * * *